United States Patent
Lee et al.

(10) Patent No.: US 8,606,087 B2
(45) Date of Patent: Dec. 10, 2013

(54) SCREEN RECORDING SYSTEM AND METHOD

(75) Inventors: Chung-I Lee, New Taipei (TW); Chien-Fa Yeh, New Taipei (TW); Cheng-Feng Tsai, New Taipei (TW); Yu-Feng Chien, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 207 days.

(21) Appl. No.: 13/325,064

(22) Filed: Dec. 14, 2011

(65) Prior Publication Data

US 2012/0213486 A1    Aug. 23, 2012

(30) Foreign Application Priority Data

Feb. 21, 2011    (TW) .............................. 100105558 A

(51) Int. Cl.
*H04N 5/917*    (2006.01)

(52) U.S. Cl.
USPC ..................... 386/328; 386/230; 386/E5.07

(58) Field of Classification Search
USPC ........................ 386/230, 328, E5.07
See application file for complete search history.

(56) References Cited

U.S. PATENT DOCUMENTS

| 7,340,103 B2 * | 3/2008 | Smirnov ...................... 382/245 |
| 2006/0104530 A1 * | 5/2006 | Smirnov ...................... 382/245 |
| 2011/0150433 A1 * | 6/2011 | Alexandrov et al. ......... 386/328 |

* cited by examiner

*Primary Examiner* — Thai Tran
*Assistant Examiner* — Girumsew Wendmagegn
(74) *Attorney, Agent, or Firm* — Altis Law Group, Inc.

(57) ABSTRACT

A screen recording method computes an encoding delay for each frame of a screen of an electronic device. The frame is encoded by a first compression algorithm if the encoding delay is short. The frame is encoded by an second compression algorithm if the encoding delay is middle and a time interval between the encoding time of a previous frame and the encoding time of a current frame does not exceed a first preset time interval. The frame is encoded by a third compression algorithm if the encoding delay is long and a time interval between the encoding time of a previous frame and the encoding time of a current frame exceeds a second preset time interval.

18 Claims, 3 Drawing Sheets

SCREEN RECORDING SYSTEM AND METHOD

BACKGROUND

1. Technical Field

Embodiments of the present disclosure relate to devices and methods for video recording, and more particularly to a screen recording system and method.

2. Description of Related Art

Screen recording is recording video of a computer desktop. The recording can also include mouse movements, and be used to create standard AVI, DivX or MPEG4 video files, for later playback.

Usually, the screen recording may take a long time. Using current screen recording tools, if an emergency occurs, like the power supply being cut off, the created AVI video file cannot be played. Thus, it is inconvenient and time-wasting.

DETAILED DESCRIPTION

Figure 1:
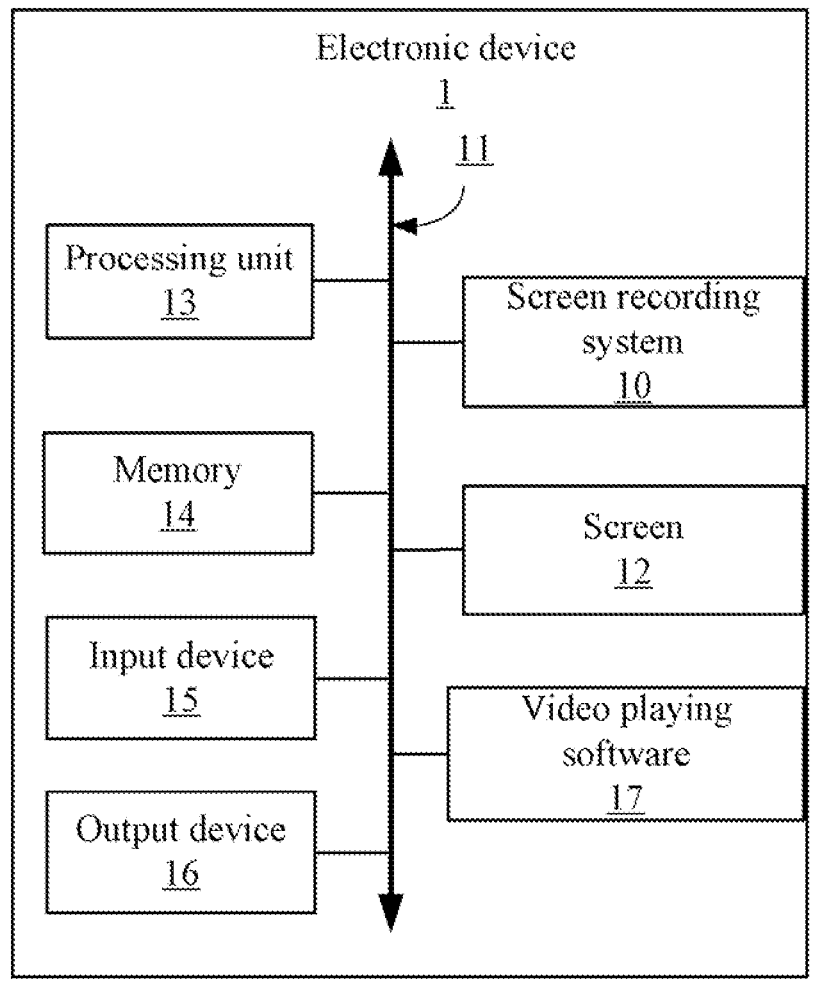
FIG. 1 is a block diagram of one embodiment of an electronic device including a screen recording system.

FIG. 1 is a block diagram of one embodiment of an electronic device 1 including a screen recording system 10. The electronic device 1 may further include components such as a bus 11, a screen 12, a processing unit 13, a memory 14, an input device 15, and an output device 16. One skilled in the art would recognize that the electronic device 1 may be configured in a number of other ways and may include other or different components. In addition, video playing software 17 may be installed on the electronic device 1. The electronic device 1 may be a computer, a smart telephone, or a personal digital assistant (PDA), for example.

Figure 2:
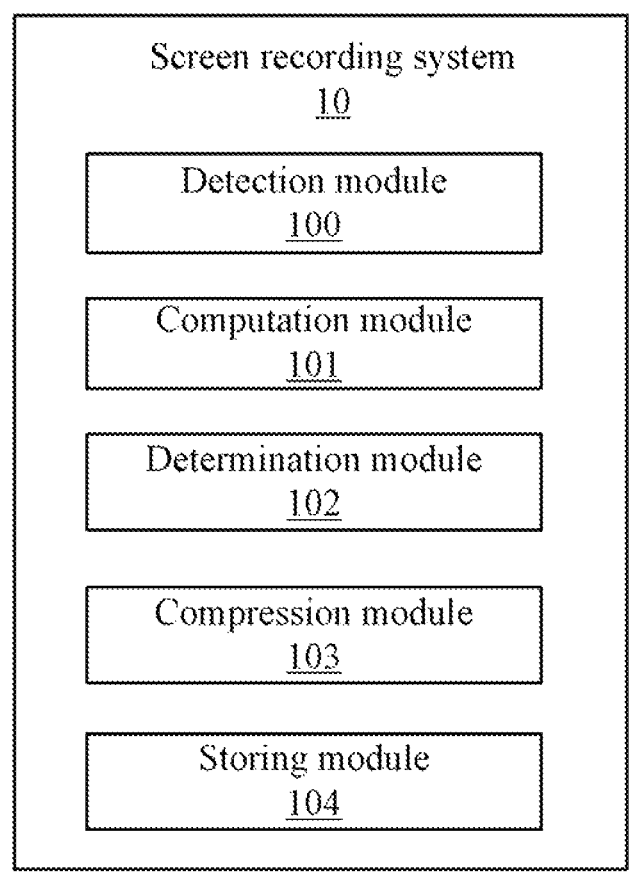
FIG. 2 is a block diagram of one embodiment of function modules of the screen recording system of FIG. 1.

The screen recording system 10 includes a number of function modules (depicted in FIG. 2). The function modules may include computerized code in the form of one or more programs, which have the functions of recording any activities displayed on the screen 12 (hereinafter screen activities), to create a video file. The screen activities include, for example, the display on the screen 12, or mouse movements. The created video file can be played using the video playing software 17.

The bus 11 permits communication among the components, such as the screen 12, the processing unit 13, the memory 14, the input device 15, and the output device 16, of the electronic device 1.

The processing unit 13 may include a processor, a microprocessor, an application specific integrated circuit (ASIC), and a field programmable gate array (FPGA), for example. The processing unit 13 may execute the computerized code of the function modules of the screen recording system 10 to realize the functions of the screen recording system 10.

The memory 14 may include a random access memory (RAM) or other type of dynamic storage device, a read only memory (ROM) or other type of static storage device, a flash memory, such as an electrically erasable programmable read only memory (EEPROM) device, and/or some other type of computer-readable storage medium, such as a hard disk drive, a compact disc, a digital versatile disc, or a tape drive. The memory 14 stores the computerized code of the function modules of the screen recording system 10 to be executed by the processing unit 13.

The memory 14 may also be used to store permanent or temporary reference data, such as what constitutes a short delay, a middle delay, a long delay, a first preset time interval, and a second preset time interval, which are described and defined below (see FIG. 3), during execution of the computerized codes by the processing unit 13.

The input device 15 may include, such as a microphone, a keyboard, a keypad, a mouse, a pen, or voice recognition and/or biometric mechanisms, for example, that permit a user to input data, such as the length or size of the short delay, the middle delay, the long delay, the first preset time interval, and the second preset time interval, to the electronic device 1.

The output device 16 may include one or more devices or mechanisms that output data, such as a video file, to the user, including a display, a printer, or one or more speakers, for example.

FIG. 2 is a block diagram of one embodiment of the function modules of the screen recording system 10. In one embodiment, the screen recording system 10 may include a detection module 100, a computation module 101, a determination module 102, a compression module 103, and a storing module 104. The function modules 100-104 may provide the functions below, and as illustrated in FIG. 3.

Figure 3:
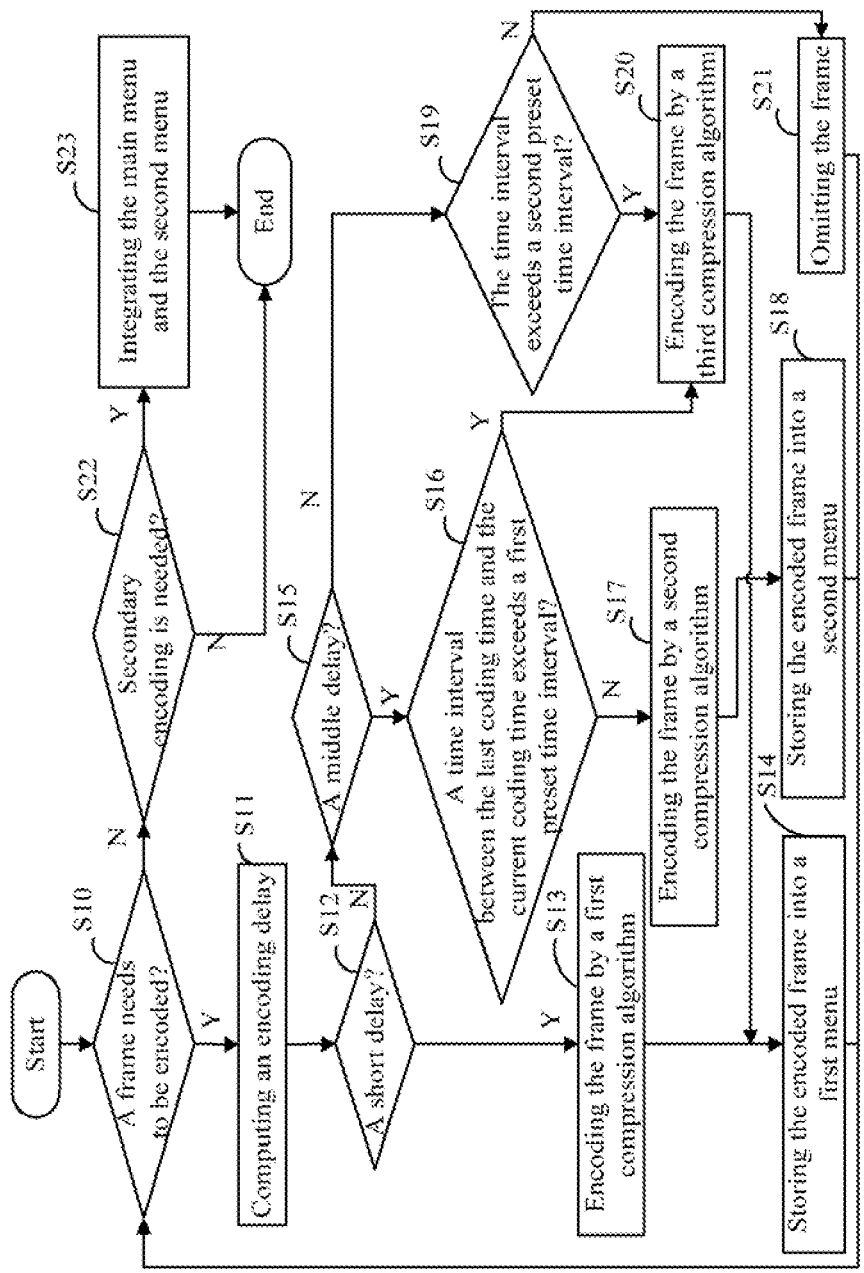
FIG. 3 is a flowchart of one embodiment of a screen recording method.

FIG. 3 is a flowchart of one embodiment of a screen recording method. Depending on the embodiment, additional blocks may be added, others removed, and the ordering of the blocks may be changed.

In block S01, the detection module 100 detects if the appearance of the screen 12, after each screen refresh cycle of the screen 12 (hereinafter, frame), needs to be encoded. In present embodiment, a frame needs to be encoded if the frame needs to be compressed. Compression is reducing irrelevance and redundancy of an image (frame) in order to be able to store or transmit data of the image in an efficient form. If any frame has not been compressed, the detection module 100 determines that the frame needs to be encoded. Block S11 is implemented if any frame of the screen activities of the electronic device 1 needs to be encoded. Otherwise, block S22 is implemented if no frame of the screen activities of the electronic device 1 needs to be encoded.

In block S11, the computation module 101 computes an encoding delay of the frame. The encoding delay is the time interval or difference between the time when "painting" the current frame on the screen 12 and the time when starting to encode the current frame. In one example, the frame rate of a video file may be 25 frame per second, which means 25 frames are "painted" in one second. The time when "painting" the second frame may be $2/25$th of a second, and the time when starting to encode the second frame may be $8/25$th of a second. Thus, the encoding delay for the second frame will be $6/25$th of a second.

In block S12, the determination module 102 determines whether the encoding delay is a short delay. The short delay, middle delay and long delay are predetermined and can be input by a user using the input device 15. In one embodiment, the user may input three durations, the shortest duration is the short delay, the longest duration is the long delay, and the last duration is the middle delay. For example, if an encoding delay is less than or equal to 500 milliseconds, the encoding delay is a short delay; if an encoding delay is greater than 500 milliseconds, but not more than 1500 milliseconds, the encoding delay is a middle delay; and if an encoding delay is greater than 1500 milliseconds, the encoding delay is a long delay. Block S13 is implemented if the encoding delay is a short delay, but block S15 is implemented if the encoding delay is not a short delay.

In block S13, the compression module 103 encodes the frame by a first compression algorithm, such as H.264 standard. The H.264 standard, also called MPEG-4 Part 10 or Advanced Video Coding (AVC), is a commonly used format for the recording, compression, and distribution of high definition video.

In block S14, the storing module 104 stores the encoded frame into a first menu to create a video file using the first menu. In present embodiment, the first menu is software. The video file so created can be played using the video playing software 17, and be output using the output device 16. Block S10 is repeated after block S14.

In block S12, if the determination module 102 determines that the encoding delay is not a short delay, then block S15 is implemented to determine whether the encoding delay is a middle delay. Block S16 is implemented if the encoding delay is a middle delay. If the encoding delay is not a middle delay, block S19 is implemented.

In block S16, the determination module 102 further determines if the time interval between the previous encoding time and the current encoding time exceeds a first preset time interval. The current encoding time is the time when the compression module 103 starts to encode the current frame, and the previous coding time is the time when the compression module 103 starts to encode the previous frame. For example, if the current frame being encoded is the third frame and the previous frame encoded was the second frame, and the time when the compression module 103 starts to encode the current frame is $6/25$th of a second, and the time when the compression module 103 starts to encode the previous frame was $2/25$th of a second, then the time interval between the previous encoding time and the current encoding time is $4/25$th of a second.

The first preset time interval and a second preset time interval mentioned below are predetermined, having been input by a user using the input device 15. In one embodiment, the second preset time interval is longer than the first preset time interval. The first preset time interval may be 500 milliseconds, and the second preset time interval may be 2,000 milliseconds for example. Block S17 is implemented if the time interval between the previous encoding time and the current encoding time does not exceed the first preset time interval. Block S20 is implemented if the time interval between the previous encoding time and the current encoding time exceeds the first preset time interval.

In block S17, the compression module 103 encodes the frame by a second compression algorithm, such as Motion-Join Photographic Experts Group (M-JPEG). M-JPEG is a video format that uses JPEG picture compression in each frame of the video. Frames of the video don't interact with each other in any way which results in much bigger file sizes, but in other hand, it makes the video editing easier because each of the frames has all of the information they need stored in them.

In block S18, the storing module 104 stores the encoded frame generated in block S17 into a second menu. The first menu is also software. Block S10 is repeated after block S18.

In block S15, if the determination module 102 determines that the encoding delay is not a middle delay, then it determines that the encoding delay must be a long delay, and in block S19, the determination module 102 determines that if the time interval between the previous encoding time and the current encoding time exceeds a second preset time interval. Block S20 is implemented if the time interval between the previous encoding time and the current encoding time exceeds the second preset time interval. Block S21 is implemented if the time interval between the previous encoding time and the current encoding time does not exceed the second preset time interval.

In block S20, the compression module 103 encodes the frame by a third compression algorithm, such as the Intra-frame encoding carried out by the H.264 standard. The Intra-frame encoding relates to groups of pictures with interframes, which refers to the fact that the various lossless and lossy compression techniques are performed within the current frame from the opening frame of each group of pictures, and not relating to any other frame in the video sequence. Block S14 is implemented to store the encoded frame generated as a result of block S20 in the first menu to create a video file by the storing module 104 after block S20.

In block S21, the frame is omitted without any compressing and encoding. Block S10 is implemented after block S21.

In block S10, if the detection module 100 detects that no frame needs to be encoded, block S22 is implemented to determine if any secondary encoding is needed by the determination module 102. Secondary encoding means the integration of the first menu and the second menu. If a second menu has been generated in the above process, block S23 is implemented to integrate the first menu and the second menu, and create a video file using the integrated file by means of the storing module 104. If no second menu has been generated, or the first menu and the second menu have already been integrated, the process ends.

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A screen recording method, being performed by execution of computerized code by a processor of an electronic device, comprising:
   computing an encoding delay of a frame of screen activities of a screen of the electronic device;
   encoding the frame by a first compression algorithm, and storing the encoded frame into a first menu, upon condition that the encoding delay is a short delay;
   encoding the frame by a second compression algorithm, and storing the encoded frame into a second menu, upon condition that the encoding delay is a middle delay and a time interval between the previous coding time and the current coding time does not exceed a first preset time interval;
   encoding the frame by a third compression algorithm, and storing the encoded frame in the first menu, upon condition that the encoding delay is a long delay, and a time interval between the previous coding time and the current coding time exceeds a second preset time interval; and
   displaying a video file on an output device using the first menu or an integration of the first menu and the second menu.

2. The method according to claim 1, wherein the encoding delay is the time interval or difference between the time when "painting" the current frame on the screen and the time when starting to encode the current frame.

3. The method according to claim 1, wherein the first compression algorithm is the H.264 standard.

4. The method according to claim 1, wherein the second compression algorithm is the Motion Joint Photographic Experts Group (M-JPEG).

5. The method according to claim 1, wherein the third compression algorithm is the Intra-frame coding of the H.264 standard.

6. The method according to claim 1, further comprising:
omitting the frame upon condition the encoding delay is a long delay and the time interval between the previous coding time and the current coding time does not exceed the second preset time interval.

7. An electronic device, comprising:
an input device;
an output device;
a screen;
a non-transitory storage medium;
at least one processor; and
one or more modules that are stored in the non-transitory storage medium; and are executed by the at least one processor, the one or more modules comprising instructions to:
compute an encoding delay of a frame of the screen activities of the electronic device;
encode the frame by a first compression algorithm, and store the encoded frame into a first menu, upon condition that the encoding delay is a short delay;
encode the frame by a second compression algorithm, and store the encoded frame into a second menu, upon condition that the encoding delay is a middle delay and a time interval between the previous coding time and the current coding time does not exceed the first preset time interval;
encode the frame by a third compression algorithm, and store the encoded frame in the first menu, upon condition that the encoding delay is a long delay, and a time interval between the previous coding time and the current coding time exceeds the second preset time interval; and
display a video file on the output device using the first menu or an integration of the first menu and the second menu.

8. The electronic device according to claim 7, wherein the encoding delay is the time interval or difference between the time when "painting" the current frame on the screen and the time when starting to encode the current frame.

9. The electronic device according to claim 7, wherein the first compression algorithm is the H.264 standard.

10. The electronic device according to claim 7, wherein the second compression algorithm is the Motion Joint Photographic Experts Group (M-JPEG).

11. The electronic device according to claim 7, wherein the third compression algorithm is the Intra-frame coding of the H.264 standard.

12. The electronic device according to claim 7, wherein the one or more modules further comprise instructions to:
omit the frame upon condition the encoding delay is the long delay and the time interval between the previous coding time and the current coding time does not exceed the second preset time interval.

13. A non-transitory storage medium having stored thereon instructions that, when executed by a processor of an electronic device, causes the processor to perform a screen recording method, wherein the method comprises:
computing an encoding delay of a frame of the screen activities of the electronic device;
encoding the frame by a first compression algorithm, and storing the encoded frame into a first menu, upon condition that the encoding delay is a short delay;
encoding the frame by a second compression algorithm, and storing the encoded frame into a second menu, upon condition that the encoding delay is a middle delay and a time interval between the previous coding time and the current coding time does not exceed a first preset time interval;
encoding the frame by a third compression algorithm, and storing the encoded frame in the first menu, upon condition that the encoding delay is a long delay, and a time interval between the previous coding time and the current coding time exceeds a second preset time interval; and
display a video file on an output device using the first menu or an integration of the first menu and the second menu.

14. The non-transitory storage medium according to claim 13, wherein the encoding delay is the time interval or difference between the time when "painting" the current frame on the screen and the time when starting to encode the current frame.

15. The non-transitory storage medium according to claim 13, wherein the first compression algorithm is the H.264 standard.

16. The non-transitory storage medium according to claim 13, wherein the second compression algorithm is the Motion Joint Photographic Experts Group (M-JPEG).

17. The non-transitory storage medium according to claim 13, wherein the third compression algorithm is the Intra-frame coding of the H.264 standard.

18. The non-transitory storage medium according to claim 13, wherein the method further comprises:
omitting the frame upon condition the encoding delay is a long delay and the time interval between the previous coding time and the current coding time does not exceed the second preset time interval.

* * * * *